Patented Oct. 15, 1946

2,409,574

UNITED STATES PATENT OFFICE 2,409,574

LUMINESCENT MATERIAL AND METHOD OF MANUFACTURE

Humboldt W. Leverenz, South Orange, N. J., assignor to Radio Corporation of America, a corporation of Delaware No Drawing. Application June 11, 1942, Serial No. 446,626

9 Claims. (Cl. 252—301.6)

My invention relates to luminescent materials and their preparation and particularly to the preparation of luminescent zinc compounds.

It has been customary in the art to synthesize luminescent materials or phosphors of zinc and cadmium sulphides by various methods although the majority of these methods result in a product which has only moderate phosphorescent properties. While I have disclosed in my copending application, Serial No. 412,687, filed September 27, 1941, a sulphide phosphor having relatively high phosphorescence of relatively long duration following excitation to luminescence, even greater intensities and longer periods of phosphorescence following excitation are desirable in certain applications in which such phosphors are utilized. For example, in aircraft position and distance indicating equipment, it is quite desirable to provide a cathode ray tube having a long persistence phosphor, such persistence rendering the tube suitable for portraying the trajectory of an approaching aircraft. Sulphide phosphors are usually characterized by their low resistance to heat. For example, the baking to which they are usually subjected during cathode ray tube manufacture reduces their efficiency and for certain applications they are wholly unsuitable for use because of their low resistance to heat.

My invention has as an object, the production of zinc compounds possessing high luminescent properties and particularly high phosphorescence without undue sacrifice of fluorescence. Another object is to provide a material which is phosphorescent over a relatively long period of time following excitation to luminescence. A further object is to provide phosphors which are insensitive to heat following synthesis so that they can be used in applications where high temperature processing, such as encountered in tube manufacture, has little or no effect on the phosphor efficiency. These and other objects, features and advantages of my invention are obtained in accordance therewith by combining a zinc sulphide and a fluoride of zinc to form a mixed sulphide-fluoride mass which is co-crystallized to form mixed sulphide-fluoride crystals. Further in accordance with my invention I provide a material in which the sulphide of zinc either may be replaced in part by zinc oxide or the zinc may be replaced in part by cadmium with or without zinc oxide prior to the formation of the mixed sulphide-fluoride crystals. Furthermore, in accordance with my invention I control the purity of the constituents within very narrow limits to provide a material having high fluorescent and phosphorescent efficiencies. I have found that such properties are exceedingly dependent upon the purification of the constituents of my phosphor. These requirements for exceedingly pure constituents apparently are due in part to the characteristics of my preferred constituents.

The above-mentioned objects are attained in part by controlling the constituent content of certain impurities. For example, the initial constituents from which I synthesize my phosphor material and particularly the zinc salt solution from which I form a sulphide should have less than the following percentage of impurities:

|    | Per cent |
|----|----------|
| Mn | 0.0008   |
| Fe | 0.0005   |
| As | 0.0008   |
| Ni | 0.00001  |

I prefer to synthesize my phosphor material starting with zinc halide or, more preferably, zinc sulphate and I remove a large proportion of inherently contained iron and certain other metals by an oxidation process to form insoluble compounds which are precipitated and removed. More particularly I make a solution of zinc sulphate $ZnSO_4 \cdot 7H_2O$) in the proportion of approximately 50 grams to 33 milliliters of pure water and add thereto a solution of hydrogen peroxide in an amount approximating 5 milliliters of 30 per cent saturated solution. I then add ammonium hydroxide until a slight white turbidity is produced. Following the addition of ammonium hydroxide I bring the solution to a boil as rapidly as possible to remove certain volatile products, such as ammonia gas, and continue to boil until ammonia fumes are unnoticeable. I then allow the solution to stand for at least 24 hours followed by decanting or by filtering to remove the precipitate. In addition to the removal of iron, these steps likewise remove aluminum, nickel and copper. Centrifuging may be employed to reduce the time necessary to bring down the precipitate.

Following the removal of the above impurities, the pH of the zinc sulphate solution should be between 4–7, any adjustment, if necessary, being made by adding an acid, such as sulphuric acid, following which I heat the zinc sulphate solution to approximately 90° C. and allow it to trickle over pure zinc for the purpose of removing all elements below zinc in the electromotive force series of the elements. The treatment with zinc metal may be accomplished at the very outset, such as by reacting an acid such as hydrochloric or sulphuric acid with zinc metal or zinc oxide in the presence of excess zinc metal. Following such a treatment the purity of the zinc sulphate solution will be approximately as indicated above, although to further assure removal of any exceedingly small amount of manganese, lead and copper, I prefer to electrolyze the solution between platinum gauze electrodes at 2-2.2 volts for a period ranging between 50-400 hours. To still further assure purity I then fractionally precipitate a small portion of the zinc as a zinc sulphide by passing a small quantity of well-purified hydrogen sulphide into the zinc sulphate solution following which the precipitated zinc sulphide is removed by filtration and discarded. This fractional precipitation step may be repeated to further lower the concentrations of undesirable impurities.

In accordance with my invention I precipitate zinc sulphide and zinc fluoride (with or without an activator, such as copper, silver or gold) from the previously prepared zinc sulphate solution or alternatively I precipitate only a pure zinc sulphide and then add to this sulphide a fluoride in a form which will convert a portion of the zinc sulphide to zinc fluoride, or still alternatively add zinc fluoride to the prepared zinc sulphide prior to calcining or heating of the mixture to produce the sulphide-fluoride phosphor. The amount of zinc fluoride either coprecipitated with the zinc sulphide or added thereto as a fluoride is relatively critical to obtain the objects of my invention. For example, the fluoride range is preferably between 0.1% and 15% by weight based on the zinc sulphide content. I have found that in addition to the zinc fluoride a limited quantity of zinc oxide in the resultant phosphor is beneficial in enhancing the phosphorescent properties thereof; and furthermore, that while a single activator, such as copper, is preferably incorporated in my phosphor in known and controlled amounts, it is particularly with the teaching of my invention to utilize a plurality of activators selected from the group consisting of copper, silver and gold. As indicated above, my phosphor consists of a mixed crystal composition and it should be understood that the zinc fluoride and zinc oxide which may be present are not necessarily present as strict chemical combinations in the final product. These materials merely symbolize the presence of fluorine and oxygen or their ions in the sulphide phosphor. The resultant phosphor may be symbolized as $ZnS(ZnF_2)_x(ZnO)_y:Cu$, wherein the subscripts $x$ and $y$ are representative of the amount of fluoride and oxide in the combined phosphor crystal composition by weight based on the zinc sulphide content. More particularly the fluoride and oxide content should be within limits such that $x$ plus $y$ is equal to 0.1% to 15% based on the zinc sulphide content of which the value $y$ is preferably equal to or greater than zero but not greater than 5%.

As one specific example of preparing the sulphide-fluoride mixture prior to calcination, I precipitate zinc sulphide from the acidified zinc sulphate solution by bubbling purified and thoroughly washed hydrogen sulphide through the solution to form a precipitate of zinc sulphide. Simultaneously with or preferably following the formation of the zinc sulphide precipitate, I precipitate zinc fluoride by adding gaseous or liquid hydrogen fluoride or an aqueous solution of hydrogen fluoride to the zinc sulphate solution. I obtain somewhat greater purity by forming the zinc fluoride by precipitation subsequent to the precipitation of the zinc sulphide especially when I decant the supernatant liquid following the formation of the zinc sulphide. The above steps are preferably performed in platinum receptacles to prevent formation of undesired fluorides although this may be obviated by forming the zinc fluoride from the filtered precipitated zinc sulphide or adding it thereto following precipitation and filtering. I then thoroughly mix the sulphide-fluoride mixture with a platinum rod or spatula. If an unactivated phosphor is desired, the mixture is dried in an oven or over a water bath, broken up and fired at a temperature of from 750° C. to 1600° C. for a period of from 10 minutes to 10 hours depending upon the particle size desired and the temperature of firing. However, if an activated material is desired, the activator metal is added to the semi-fluid paste as a soluble salt in a water solution and then the material is dried and fired as above. As explained below in greater detail certain fluxing agents may be added to the activated or unactivated material to assist the thermo-synthesis of the phosphor.

As a specific example of one teaching of my invention, I add to 100 grams of the pure precipitated zinc sulphide and contained in a platinum crucible a quantity of zinc fluoride between 0.5% and 5% based on the zinc sulphide by weight such as 2 grams of zinc fluoride. Alternatively I add a sufficient quantity of a substance, such as hydrogen fluoride or ammonium fluoride, which will react with the zinc sulphide to yield the desired quantity of zinc fluoride. The specific quantity of zinc fluoride cited above, that is, 2% based on the zinc sulphide content, is preferred inasmuch as sulphides of this composition exhibit optimum phosphorescence under 3650 Å. radiation without undue aggregation. One or more activator metals selected from the group consisting of copper, silver and gold may be used and I prefer to add this activator as a soluble salt of the metal either preceeding or following the precipitation of the zinc sulphide or following the preparation of the zinc sulphide-zinc fluoride mixture. Since the sulphides of copper, silver and gold are extremely insoluble, it is immaterial whether their soluble salts be added before or after the precipitation of the zinc sulphide. Thus, for example, to the purified zinc sulphate solution or to the wet mixture of zinc sulphide and zinc fluoride I add an aqueous solution containing the activator metal or metals as soluble salts. I have found for the above preparations, the amount of copper may vary over wide limits; for example, the amount may vary from 0.00001% to 0.1% molal with respect to the zinc sulphide content, although I prefer in the above example to add 0.01 gram of copper as the fluoride. I have found that the use of silver or gold as an activator with the copper increases the phosphorescence of the resultant material and the amount of copper, silver and gold may vary from 0.00001% to 0.1% molal, each with respect to the zinc sulphide content. In addition I have found that in a multi-activated phosphor the quantity of the individual activators may decrease in the order of silver, copper and gold, the gold being less than the copper and the copper being less than the silver. The relative proportion of these three activators may be one part gold, two parts copper and four parts silver. However, for varying the phosphorescent characteristic these relative proportions may vary above and below the optimum proportion. I have found that the period of useful phosphorescence in a silver-gold activated material increases in accordance with the amount of gold with respect to silver and similarly with a copper-silver or copper-gold activator, the period of useful phosphorescence increases with the quantity of copper and gold respectively. The use of 0.1% of silver and .005% copper by weight, to weight of zinc sulphide, gives optimum phosphorescence under cathode ray excitation.

To aid in the thermo-synthesis or calcination of my phosphor I have found that specific preferred fluxing agents or catalysts may be mixed with the sulphide-fluoride mixture prior to the calcining or firing steps. I specifically avoid such commonly used fluxing agents or materials as boric acid, magnesium-fluoride and calcium carbonate, which do not completely evaporate or form readily removable compounds, by using a sodium or potassium chloride or bromide fluxing agent which controls the crystal growth and phosphor formation upon calcination to far better advantage than other fluxes in the preparation of the conventional sulphide phosphors. The sodium or potassium chlorides (or bromides) react with the zinc sulphide to form zinc chloride (or bromide) which sublimes at 732° C. leaving easily soluble sodium or potassium sulphides. I, therefore, add to the wet zinc sulphide-zinc fluoride an aqueous solution containing 2 grams of sodium or potassium chloride (or bromide) following which I evaporate to dryness, such as in an oven or under an infra-red lamp or over a water bath. I then place the material in the powdered state in a clean quartz crucible although a platinum crucible may be used where the life of the crucible is an economic factor in commercial preparation. I then place the crucible and its contents in a clean electric furnace and raise the temperature of the furnace to between 750° C. and 1600° C. and maintain this temperature for a time interval of from 10 minutes to 10 hours, the total heating time and temperature depending upon the phosphorescence intensity and particle size desired in the resulting phosphor material, the particle size and phosphorescence intensity increasing with the time of calcination. Lower temperatures, such as 750° C.–1000° C. yield smaller crystals, but higher temperatures, such as 1100° C.–1300° C. give higher phosphorescent intensity. Following crystallization the material is removed from the crucible, those portions which reacted therewith being detected under ultra-violet excitation and usually discarded whereupon the crystallized material in accordance with my invention is then washed with vigorous stirring in pure distilled water saturated with hydrogen sulphide. I have found that the period of washing should be short and that preferably the material may be washed two to three times in pure water saturated with hydrogen sulphide. The material should not be subjected to the washing water for a period in excess of 10–100 minutes (shorter time for higher fluoride content) following which the material is immediately dried at a temperature from 100° C. to 250° C. whereupon it is ready for use. I have found that my product not only has exceptionally high phosphorescent properties and excellent stability to heat but that such phosphorescence is not obtained at a sacrifice of fluorescence and further that my method of production may provide a smooth flowing, substantially non-aggregated, non-flocculent material which may be easily applied during the subsequent manufacture of luminescent coatings.

I claim:

1. A luminescent phosphor essentially consisting of a thermally crystallized combination of a sulphide and fluoride of a metal selected from the group of metals consisting of zinc and cadmium wherein the fluoride is between 0.1% and 15% by weight based on the weight of said sulphide.

2. A luminescent phosphor essentially consisting of a thermally crystallized zinc sulphide-zinc fluoride combination wherein the zinc fluoride is between 0.1% and 15% by weight based on the zinc sulphide content.

3. A crystalline luminescent phosphor composition represented by the general formula $$MS(MF_2)_x(MO)_y$$

wherein M is a metal selected from the group of metals consisting of zinc and cadmium, F is fluorine, S is sulphur, O is oxygen, and $x$ and $y$ represent the weight of fluoride and oxide respectively in the composition and each being greater than zero and wherein the sum of $x$ and $y$ lies between 0.1% and 15% of the weight of MS.

4. A crystalline phosphor as claimed in claim 3 wherein the value of $y$ is greater than zero and is not greater than 5%.

5. A crystalline luminescent phosphor represented by the general formula $ZnS(ZnF_2)_x(ZnO)_y$ wherein $x$ and $y$ represent the weight of zinc fluoride and zinc oxide respectively in the combined composition and wherein the sum of $x$ and $y$ lies between 0.1% to 15% of the weight of zinc sulphide content.

6. The method of manufacturing a luminescent phosphor composition comprising the steps of adding a fluoride to a sulphur compound of a metal selected from the group of metals consisting of zinc and cadmium to form a mixture thereof, adding to said mixture a flux to aid crystallization, and crystallizing said mixture by firing at a temperature between 750° C. and 1600° C.

7. The method of manufacturing a luminescent phosphor composition comprising the steps of adding a fluoride of a metal selected from the group of metals consisting of zinc and cadmium to a sulphide of said metal to form a mixture of said fluoride and sulphide, adding to said mixture a flux to aid crystallization, and crystallizing said mixture as a combined fluoride and sulphide by firing said mixture and said flux at a temperature between 750° C. and 1600° C.

8. The method of manufacturing a sulphide phosphor comprising preparing a solution of a sulphide of a metal in the group consisting of zinc and cadmium having a pH ratio between 4 and 7, the said solution having a maximum impurity by weight with respect to the solution of:

| | Per cent |
|---|---|
| Mn | 0.0008 |
| Fe | 0.0005 |
| As | 0.0008 |
| Ni | 0.00001 | precipitating a sulphide and a fluoride of said metal from said solution, adding a flux to the precipitate, drying said precipitate and flux, and firing the precipitate and flux at a temperature sufficient to crystallize the dried precipitate as a mixed sulphide-fluoride phosphor.

9. The method of synthesizing a luminescent sulphide compound of a metal selected from the group consisting of zinc and cadmium comprising mixing with a compound of said metal a quantity of a fluoride of an element selected from the group consisting of said metal and hydrogen and firing said mixture to crystallize said compound in the presence of said fluoride.

HUMBOLDT W. LEVERENZ.